(12) United States Patent
Hjulstad

(10) Patent No.: US 12,320,201 B2
(45) Date of Patent: Jun. 3, 2025

(54) OPTICALLY MACHINE READABLE IDENTIFIERS FOR TUBULAR SECTIONS

(71) Applicant: Equinor Energy AS, Stavanger (NO)

(72) Inventor: Åsmund Hjulstad, Bru (NO)

(73) Assignee: EQUINOR ENERGY AS, Stavanger (NO)

( * ) Notice: Subject to any disclaimer, the term of this patent is extended or adjusted under 35 U.S.C. 154(b) by 98 days.

(21) Appl. No.: 18/036,318

(22) PCT Filed: Nov. 10, 2021

(86) PCT No.: PCT/NO2021/050233
§ 371 (c)(1),
(2) Date: May 10, 2023

(87) PCT Pub. No.: WO2022/103273
PCT Pub. Date: May 19, 2022

(65) Prior Publication Data
US 2024/0003196 A1    Jan. 4, 2024

(30) Foreign Application Priority Data
Nov. 11, 2020  (GB) ...................................... 2017776

(51) Int. Cl.
*E21B 17/00* (2006.01)
*G06K 7/14* (2006.01)

(52) U.S. Cl.
CPC .......... *E21B 17/006* (2013.01); *G06K 7/1413* (2013.01); *G06K 7/1417* (2013.01)

(58) Field of Classification Search
CPC ........ E21B 17/006; E21B 17/00; E21B 19/00; G06K 7/1413; G06K 7/1417; G06Q 10/0833
See application file for complete search history.

(56) References Cited

U.S. PATENT DOCUMENTS 7,159,654 B2 *  1/2007  Ellison ................... E21B 44/00
                                                   166/250.01
8,463,664 B2    6/2013  Griggs et al.
(Continued)

FOREIGN PATENT DOCUMENTS

WO   WO 2012/115717 A2   8/2012
WO   WO 2012/128735 A1   9/2012
WO   WO 2016/019039 A1   2/2016

OTHER PUBLICATIONS

International Search Report, issued in PCT/No. 2021/050233, dated Jan. 21, 2022.
(Continued)

*Primary Examiner* — Omeed Alizada
(74) *Attorney, Agent, or Firm* — Birch, Stewart, Kolasch & Birch, LLP

(57) ABSTRACT

The method includes providing first and second machine readable codes on an external surface of each tubular section wherein the second code encodes less information than the first code and is derivable from, or mapped to, information encoded in the first code; using a machine to read the first machine readable code at a first pipe handling location on said platform; storing information of the read first codes; moving the sections in turn to a second pipe handling location, the second pipe handling location being a tubular structure assembly location on said platform or a location intermediate said first and second locations; using an optical machine at or close to the second pipe handling location to read the second codes from positioned sections; and storing information of the read second codes and their sequence order.

9 Claims, 3 Drawing Sheets

(56) References Cited

U.S. PATENT DOCUMENTS

| | | |
|---|---|---|
| 2005/0230109 A1 | 10/2005 | Kammann et al. |
| 2007/0124220 A1 | 5/2007 | Griggs et al. |
| 2011/0175343 A1* | 7/2011 | Akins ................... G09F 3/00 283/74 |
| 2012/0212326 A1 | 8/2012 | Christiansen et al. |
| 2015/0308252 A1* | 10/2015 | Grinrod ................ E21B 44/00 700/275 |

OTHER PUBLICATIONS

United Kingdom Combined Search and Examination Report, issued in Priority Application No. 2017776.2, dated Aug. 18, 2021.
Written Opinion of the International Searching Authority, issued in PCT/NO2021/050233, dated Jan. 21, 2022.

* cited by examiner

OPTICALLY MACHINE READABLE IDENTIFIERS FOR TUBULAR SECTIONS

TECHNICAL FIELD

The present invention relates to optically machine readable identifiers for tubular sections and other downhole components such as are used to form structures or strings for use in well bores extending through a subsurface formation of the Earth.

BACKGROUND

In the context of hydrocarbon exploration and production, during downhole operations, especially when running a downhole tubular, it is important to maintain accurate records of the tubular sections and other components that have been added to the tubular, and in which order they have been added. It is therefore known to mark the exterior of tubular sections with identifying markings. These markings may uniquely identify tubular sections for a given producer or for a particular manufacturing batch, or may even be globally unique. As each tubular section is added, its identifier can be noted for later use, for instance to identify the batch or source of a failed section. However, markings capable of uniquely identifying a tubular section are unlikely to be easily readable, at least by machine, e.g. a camera, and in particular from a distance whilst the tubular section is being handled or added to a tubular structure.

As well as for example etched or painted on serial numbers, various types of machine readable markings are known for applying to tubular sections in order to identify them. Barcodes are one example. 1-dimensional (1D) barcodes are however unlikely to be able to encode sufficient information for unique identification, without becoming prohibitively long, at least to enable optical machine reading from a distance. Whilst 2-dimensional (2D) barcodes are capable of representing sufficient information in a relatively small area, small 2D barcodes are again unlikely to be easily readable from a distance whilst large ones may be distorted by the shapes of the tubular sections. 2D barcodes also have the disadvantage that the reading angle may be important (in contrast to 1D barcodes).

SUMMARY OF THE INVENTION

In an aspect of the present invention, there is provided a method of handling tubular sections and/or other downhole components for use in constructing a tubular structure to be lowered into a well bore extending through a formation of the Earth beneath a platform, the method comprising: providing first and second machine readable codes on an external surface of each tubular section and/or each other downhole component, wherein each first code comprises a 2D barcode and/or a radio-frequency identification tag, each second code comprises a 1D barcode and, for each section or component: the second code encodes less information than the first code; and is derivable from, or mapped to, information encoded in the first code; using a machine to read the first machine readable code from the tubular sections or components at a first pipe handling location on said platform; storing information of the read first codes in a computer data storage medium; moving the tubular sections or components in turn from said first pipe handling location to a second pipe handling location, the second pipe handling location being a tubular structure assembly location on said platform or a location intermediate said first location and said tubular structure assembly location; using an optical machine at or close to the second pipe handling location to read the second codes from positioned tubular sections or components; storing information of the read second codes and their sequence order in a computer data storage medium, wherein the stored information of the read second codes and their sequence order can be used subsequently to obtain a corresponding sequence of information of the first codes.

In an embodiment, the method may further comprise: verifying the identity of each of the positioned tubular sections and/or components using the read second codes and their sequence order.

In an embodiment, the method may further comprise: obtaining a desired sequence in which tubular sections and/or components are to be added to the tubular structure, and wherein verifying the identity of each of the positioned tubular sections and/or components comprises using the read second codes and their sequence order to compare the sequence of positioned tubular sections and/or components to the desired sequence.

In an embodiment, obtaining a desired sequence in which tubular sections and/or components are to be added to the tubular structure may comprise obtaining a corresponding desired sequence of second codes or of information encoded therein, and verifying the identity of each of the positioned tubular sections and/or components may comprise comparing the read second codes and their sequence order to the desired sequence of second codes or information encoded therein.

In an embodiment, obtaining a desired sequence in which tubular sections and/or components are to be added to the tubular structure may comprise obtaining a corresponding desired sequence of first codes or of information encoded therein, and verifying the identity of each of the positioned tubular sections and/or components may comprise: obtaining a corresponding sequence of information of the first codes, by mapping the stored information of the read second codes to information of the corresponding first codes; and comparing the sequence of information of the first codes to the desired sequence of first codes or information encoded therein.

In an embodiment, obtaining the corresponding sequence of information of the first codes may comprise performing a look-up in a database which stores the information encoded in the first and second codes of each tubular section and/or component in association.

In an embodiment, for each section or component, the first code may uniquely identify the section or component.

In an embodiment, for each section or component, the second code may encode at least a portion of a hash of the information encoded in the first code.

In an embodiment, the second code may encode a portion of the information encoded in the first code. Optionally, the second code may encode a prefix or suffix of the information encoded in the first code.

In an embodiment, the optical machine may comprise a camera.

In another aspect of the invention, there is provided a method of handling tubular sections and/or other downhole components for use in constructing a tubular structure to be lowered into a well bore extending through a formation of the Earth beneath a platform, the method comprising: providing first and second machine readable codes on an external surface of each tubular section and/or each other downhole component wherein, for each section or component: the second code encodes less information than the first code; and the second code, or the information encoded by the second code, is derivable from, or mapped to, information encoded in the first code; using a machine to read the first machine readable code from the tubular sections or components at a first pipe handling location on said platform; storing information of the read first codes in a computer data storage medium; obtaining a desired sequence in which tubular sections and/or other downhole components are to be added to the tubular structure; moving the tubular sections or components in turn from said first pipe handling location to a second pipe handling location, the second pipe handling location being a tubular structure assembly location on said platform or a location intermediate said first location and said tubular structure assembly location; using an optical machine at or close to the second pipe handling location to read the second codes from positioned tubular sections or components; storing information of the read second codes and their sequence order in a computer data storage medium; and verifying the identity of each of the positioned tubular sections and/or components using the read second codes and their sequence order.

In another aspect of the present invention, there is provided a method of handling tubular sections and/or other downhole components for use in constructing a tubular structure to be lowered into a well bore extending through a formation of the Earth beneath a platform, the method comprising: providing first and second machine readable codes on an external surface of each tubular section and/or other downhole components wherein, for each section or component, the second code encodes less information than the first code and is derivable from, or mapped to, information encoded in the first code; using a machine to read the first machine readable code from the tubular sections or components at a first pipe handling location on said platform; storing information of the read first codes in a computer data storage medium; moving the tubular sections or components in turn from said first pipe handling location to a second pipe handling location, the second pipe handling location being a tubular structure assembly location on said platform or a location intermediate said first and second locations; using an optical machine at or close to the second pipe handling location to read the second codes from positioned tubular sections or components; and storing information of the read second codes and their sequence order in a computer data storage medium. The stored information of the read second codes and their sequence order can be used subsequently to obtain a corresponding sequence of information of the first codes.

DETAILED DESCRIPTION

As has been noted above, whilst barcodes and in particular 1-dimensional (1D) barcodes are useful as optically machine readable codes, they present problems when it comes to presenting machine readable information in a platform environment where tubular sections are assembled into a tubular structure or string. The present invention addresses these problems by providing tubular sections with a combination of identifiers.

Figure 1:
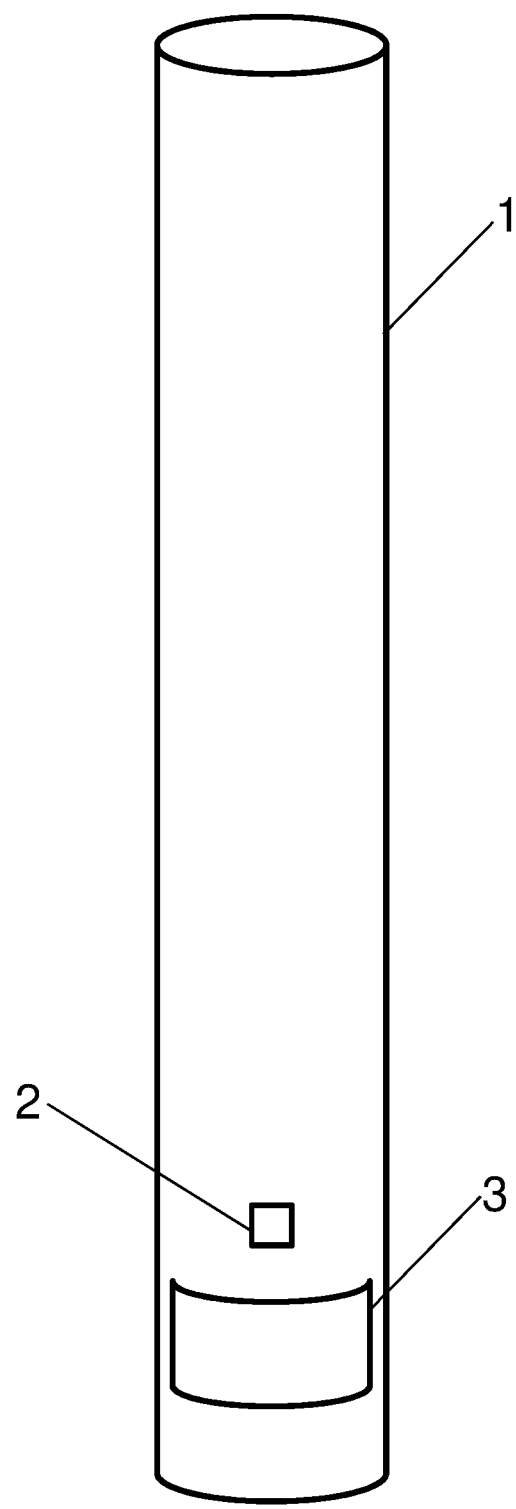
FIG. 1 shows a tubular section according to the present invention.

FIG. 1 shows a tubular section 1 embodying the present invention. The tubular section 1 is provided with first and second machine readable codes 2, 3 on its exterior surface. The first code 2 is in the form of a machine readable 2D barcode, for example a Data Matrix or QR code, or an Aztec code. The first code 2 is capable of identifying the particular tubular section 1 to which it is applied, by encoding information including a first identifier. The first identifier may be unique to the manufacturer, to a particular manufacturing batch, or to the platform operator. In some cases it may even be globally unique, for example a General Identifier (GID-96). The information can be encoded as a binary number, as is known for radio-frequency identification tag (RFID) tags, and written in the barcode as binary data. Alternatively, the information may be encoded as a Uniform Resource Name (URN) or in combination with a resolver as a Uniform Resource Locator (URL), i.e. so that the read information can be copied into a web browser address line and a result returned with details of the identified section. The 2D barcode can be relatively small in size, for example only a few square centimetres. It may be readable using a handheld computer device such as a smartphone.

The second machine readable code 3 is in the form of a 1 D barcode, for example a Code 128 barcode. 1D barcodes are generally less susceptible than 2D barcodes to distortion due to the cylindrical shape of the tubular section 1. The 1D barcode can therefore be relatively large in size in comparison to the 2D barcode, so as to be easily readable at a distance and from any direction. As a result, the 1D barcode encodes less information than the 2D barcode, and whilst it is capable of representing a second identifier distinguishing the tubular section 1 from one or more other tubular sections, it is not necessarily globally unique. Importantly, the second code 3 is derived from the first code 2 or from information encoded in the first code 2. This may be achieved by applying a function, such as a hash function (for example Message-Digest algorithm 5 (MD5)) to the identifier encoded in the first code 2. At least part of the generated hash value (for example the last six or eight digits) may then be represented by the 1D barcode of the second code 3.

Figure 2:
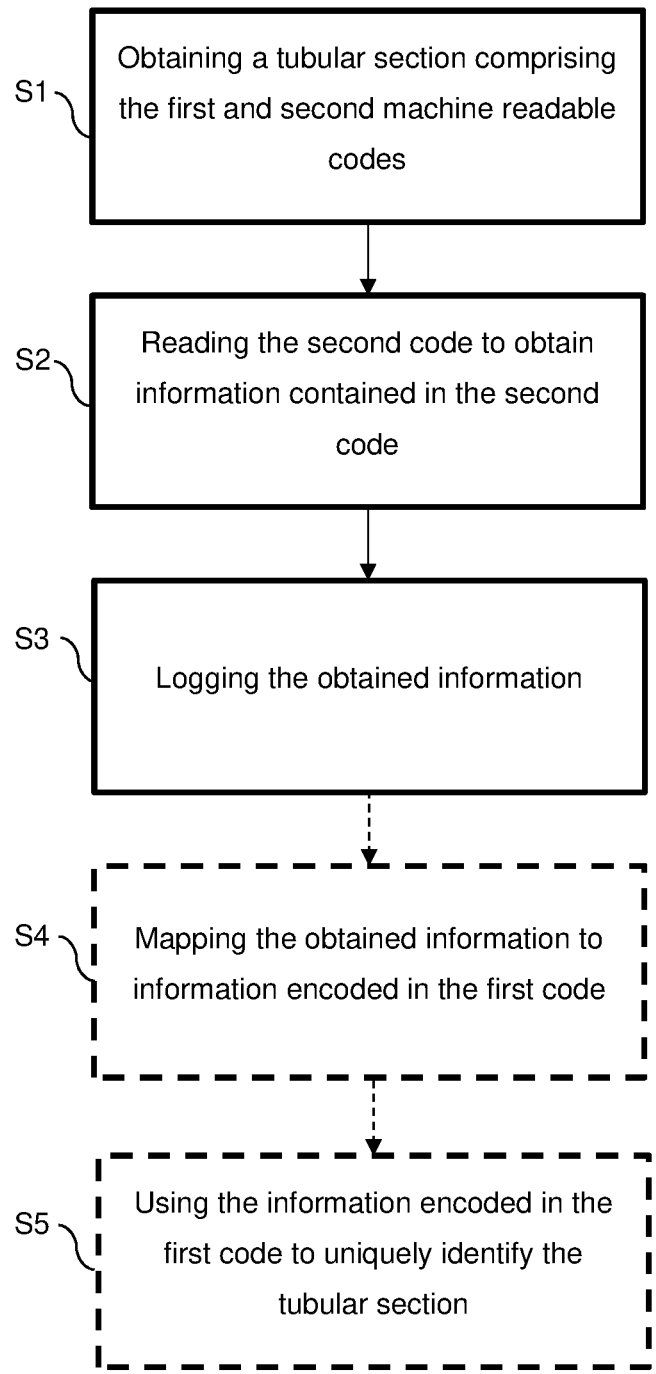
FIGS. 2 and 3 are flow diagrams illustrating methods of handling tubular sections.

A method for using a tubular section according to the present invention will now be described with reference to FIG. 2. In step S1, a tubular section 1 is obtained which comprises the first and second codes 2, 3 in the form of the 1 D and 2D barcodes described above. The section may be provided with both barcodes during production at the mill, or one or both of the barcodes may be added later, e.g. at a shipping yard, dockside, or on a platform. A database is created which maps the relationships between the first and second codes 2, 3 associated with each section 1.

In step S2, the 1D barcode is then read to obtain the second identifier. For example, the 1D barcode may be read electronically by an optical scanner such as a barcode reader, or an image capturing device such as a camera with associated software. This step may be carried out during handling of the tubular section prior to its addition to the tubular structure, for example while the section is being manoeuvred, or once the section has been lowered into the box end of the previous tubular section prior to joining. The 1D code may also, or alternatively, be read at an intermediate location, for example on the "cat walk" (trolley for moving items between handling range of pipe deck crane and drill floor equipment), or in the fingerboard (storage location on drill floor where pipe is vertical). [NB. These are two examples where convenient/typical/existing camera locations only see the tubulars from one angle, and would benefit from a code that is readable regardless.]

The camera is located relatively close to the assembly location, e.g. several meters or several tens of meters. The information obtained by reading the 1D barcode is then logged (S3), for example by a computing device connected to the device used to read the 1D barcode. As and when required, optional steps S4 and S5 may be performed to uniquely identify the tubular section 1. In step S4, the obtained second identifier is mapped to the first identifier of the tubular section 1. This may be achieved by using the previously mentioned database. Finally, in optional step S5, the first identifier may be used to uniquely identify the tubular section 1.

In one section handling method, an operator, for example located on an off-shore platform, first reads the 2D barcode to uniquely identify the section 1. This may be performed with the tubular section 1 in a safe and accessible location or configuration, for example laying on the deck, such that the 2D barcode can be read at close range, for example by a scanner, smartphone or the like. After identifying the section 1, information relating to various properties of the section can be obtained, for example its desired location within a multi-section tubular to be assembled. This information can be used to assist in the organisation of the section 1 amongst the various other tubular sections on deck, in preparation for the assembly of the tubular. The section 1 is then manoeuvred into a vertical position, and may be placed in build stands before being brought to the well centre and lowered towards the end of a preceding section of the tubular. Whilst the section 1 is being manoeuvred and once in position in the well centre, it will likely no longer be possible or safe to approach the section at a close enough range to read the 2D barcode. However, the 1D barcode could be read effectively at this range, and steps S2 to S5 can be performed prior to joining, to verify that the correct section is about to be added to the tubular.

Often, a multi-section tubular is assembled according to a design or plan, specifying a desired sequence in which tubular sections or other downhole components are to be added to the tubular structure (or "running order"). This may correspond to a sequence in which said tubular sections or other downhole components are to be found in the finished structure. It is important that the correct sections are added to the tubular, and that they are added in the correct sequence according to the design. However, as described above, there may be a number of handling steps required between an initial organisation of the sections (e.g. on the platform deck), and their addition to the tubular. The dual codes of the present disclosure allow for each section to be verified as the correct section for a given position in the tubular, at a location that is at or close to the assembly location and from where unique 2D codes may not be safely or easily readable.

Figure 3:
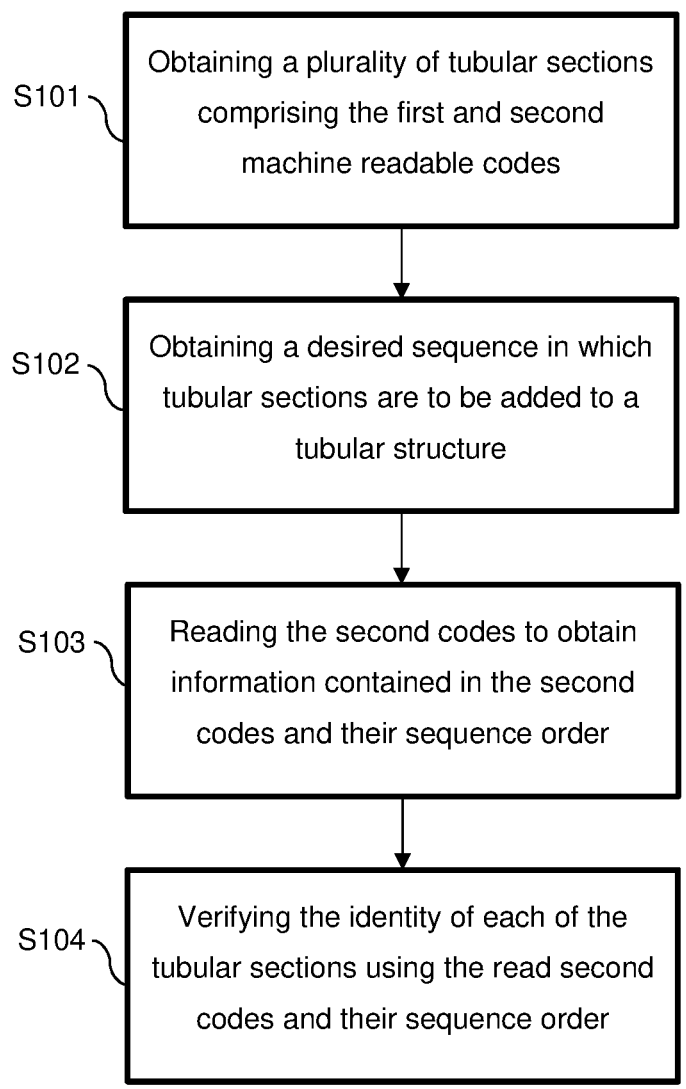

As shown in FIG. 3, this can be achieved by obtaining a plurality of tubular sections tagged with the dual codes described herein (S101), and obtaining the desired running order (S102). The running order may be pre-determined, and/or may be determined using information obtained from scanning the 2D codes as described above. The identity of each section can then be verified prior to its addition to the tubular, by comparing the codes on the sections to the running order. In one example, a running order of 1 D codes is obtained by mapping between the 1 D and 2D codes, and verifying the sections comprises comparing the read 1D codes and their sequence order to the previously obtained running order of 1 D codes. In this way, when the 1D code is scanned, the section can be verified without the need for mapping between the 1 D and 2D codes (as that mapping was performed a priori). In another example, a running order of 2D codes is obtained. In this example, each read 1D code is first mapped to its corresponding 2D code to obtain a sequence of 2D codes. The sections can then be verified by comparing the obtained sequence of the 2D codes to the running order of 2D codes.

The result of the verification step (S104) can then be used to inform subsequent decisions and/or actions. For example, if a section is verified as being the correct section for that position in the sequence, it may be added to the tubular. If a section is found not to be the correct section for that position in the sequence, the section can be replaced with a different section. In some examples, if a section is found not to be the correct section for that position, the section may still be added to the tubular, and the running order may be updated accordingly.

The tubular sections 1 making up the tubular structure can therefore be uniquely and easily identified from a distance. Providing the first code 2 on the tubular section 1 by way of a 2D barcode, in addition to the second code 3, allows for fast and simple unique identification of the tubular section when the tubular section can be read close-up, for example during manufacture of the tubular section at a mill, during transit, or prior to assembly on-rig. Furthermore, by deriving the second code 3 from the first code 2 using a mapping function, in particular a hash function, the probability of identifier collisions is reduced. In contrast, the use of simple running serial numbers could likely introduce collisions between identifiers of tubulars belonging to separate batches, where numbering is restarted in between batches.

Prior to use, the 1 D and 2D barcodes are applied to the exterior surface of the tubular sections 1 by any suitable method, including painting or etching. Once the barcodes have been applied to the tubular sections 1, a layer of varnish or lacquer may be applied over the top. The barcodes may also be applied at any suitable position.

Advantageously, as shown in FIG. 1, the 1D barcode may be located near the box end of the tubular section 1, for easy detection when the section 1 is located in the slips during tubular assembly. So as to be easily readable from a distance, the 1D barcode may also extend around a substantial portion, or the entirety, of the circumference of the section 1, and/or may be, for example, 10 to 40 cm in length.

It will be appreciated that various modifications may be made to the invention as described above. For example, the first code 2 may be in the form of an RFID tag instead of a 2D barcode. The second code 3 is also not limited to the form of a 1D barcode, provided that it is optically readable. The second code 3 could be, for example, a simple string of alphanumeric characters, although this may make reading of the second code more difficult. In an example, the second code is in a format which is capable of encoding less information than the format of the first code (and is therefore capable of uniquely identifying its tubular section from a smaller set of other sections than the format of the first code), but which is capable of being read from a greater distance and/or from a greater reading angle than the format of the first code.

Furthermore, the mapping function is not limited to a hash function, and could be, for example, a random mapping function, i.e. for each first identifier a second identifier is randomly generated and associated with the first identifier (with the association being maintained in a suitable database). In one example, the information encoded by the 1D code corresponds to a portion of the information encoded by the 2D code, e.g. the 1D code encodes a prefix or suffix of the information encoded by the 2D code. This allows for the 1D code to be easily mapped to the 2D code, for example by a human operator. Although this may increase the probability of a conflict of codes between different sections, the use of a running order (as described above) may reduce the probability of such a conflict to an acceptable degree.

In addition to information encoded by the first and second codes, further information may be stored for each section. This further information may be added before assembly of the tubular (e.g. physical properties of the section), or after (e.g. torque-turn data).

Whilst the above description relates to tubular sections, a similar approach may be used to identify and log other downhole components such as Bottom Hole Assemblies (BHAs), screens, etc. Furthermore, rather than providing the 1 D and 2D codes directly on an exterior surface of the tubular sections (or other downhole components), these might be attached to the pin or box end thread protector caps ('pin/box protector').

The invention claimed is:

1. A method of handling tubular sections and/or other downhole components for use in constructing a tubular structure to be lowered into a well bore extending through a formation of the Earth beneath a platform, the method comprising:
providing first and second associated machine readable codes on an external surface of each tubular section and/or each other downhole component, wherein each first code encodes information including a unique identifier and comprises a 2D barcode and/or a radio-frequency identification tag, each second code comprises a 1D barcode and, for each section or component: the second code encodes less information than the first code; and the second code, or the information encoded by the second code, is derivable from, or mapped to, the information encoded in the first code;
using a machine to read the first machine readable code from the tubular sections or components at a first pipe handling location on said platform;
storing information of the read first codes in a computer data storage medium;
moving the tubular sections or components in turn from said first pipe handling location to a second pipe handling location, the second pipe handling location being a tubular structure assembly location on said platform or a location intermediate said first location and said tubular structure assembly location;
using an optical machine at or close to the second pipe handling location to read the second codes from positioned tubular sections or components;
storing information of the read second codes and their sequence order in a computer data storage medium; and
determining for each of the read second codes an associated first code or a corresponding unique identifier from the read first codes, in order to determine a sequence of first codes or identifiers uniquely identifying the sequence of tubular sections and/or other downhole components passing through the second pipe handling location.

2. The method of claim 1, further comprising:
verifying the identity of each of the positioned tubular sections and/or components using the determined sequence of first codes or identifiers.

3. The method of claim 2, further comprising:
obtaining a desired sequence in which tubular sections and/or components are to be added to the tubular structure, and wherein verifying the identity of each of the positioned tubular sections and/or components comprises using the determined sequence of first codes or identifiers to compare the sequence of positioned tubular sections and/or components to the desired sequence.

4. The method of claim 3, wherein obtaining a desired sequence in which tubular sections and/or components are to be added to the tubular structure comprises obtaining a corresponding desired sequence of first codes or identifiers, and wherein verifying the identity of each of the positioned tubular sections and/or components comprises:
comparing the determined sequence of first codes or identifiers to the desired sequence of first codes or identifiers.

5. The method of claim 4, wherein determining for each of the read second codes the associated first code or the corresponding unique identifier from the read first codes comprises performing a look-up in a database which stores the information encoded in the first and second codes of each tubular section and/or component in association.

6. A method according to claim 1, wherein, for each section or component, the second code encodes at least a portion of a hash of the information encoded in the first code.

7. A method according to claim 1, wherein the second code encodes a portion of the information encoded in the first code, optionally wherein the second code encodes a prefix or suffix of the information encoded in the first code.

8. A method according to claim 1, wherein said optical machine comprises a camera.

9. A method of handling tubular sections and/or other downhole components for use in constructing a tubular structure to be lowered into a well bore extending through a formation of the Earth beneath a platform, the method comprising:
providing first and second associated machine readable codes on an external surface of each tubular section and/or each other downhole component, wherein each first code encodes information including a unique identifier, and wherein, for each section or component: the second code encodes less information than the first code; and the second code, or the information encoded by the second code, is derivable from, or mapped to, the information encoded in the first code;
using a machine to read the first machine readable code from the tubular sections or components at a first pipe handling location on said platform;
storing information of the read first codes in a computer data storage medium;
obtaining a desired sequence in which tubular sections and/or other downhole components are to be added to the tubular structure;
moving the tubular sections or components in turn from said first pipe handling location to a second pipe handling location, the second pipe handling location being a tubular structure assembly location on said platform or a location intermediate said first location and said tubular structure assembly location;
using an optical machine at or close to the second pipe handling location to read the second codes from positioned tubular sections or components;
storing information of the read second codes and their sequence order in a computer data storage medium;
determining for each of the read second codes an associated first code or a corresponding unique identifier from the read first codes, in order to determine a sequence of first codes or identifiers uniquely identifying the sequence of tubular sections and/or other downhole components passing through the second pipe handling location; and verifying the identity of each of the positioned tubular sections and/or components using the determined sequence of first codes or identifiers.

* * * * *